United States Patent
Veilleux, Jr. et al.

(10) Patent No.: US 9,541,119 B2
(45) Date of Patent: Jan. 10, 2017

(54) FITTING WITH DUAL SERRATED LOCKING RINGS

(71) Applicant: Hamilton Sundstrand Corporation, Charlotte, NC (US)

(72) Inventors: Leo J. Veilleux, Jr., Wethersfield, CT (US); Lubomir A. Ribarov, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 79 days.

(21) Appl. No.: 14/563,274

(22) Filed: Dec. 8, 2014

(65) Prior Publication Data
US 2016/0160903 A1   Jun. 9, 2016

(51) Int. Cl.
*F16B 37/04* (2006.01)
*F16B 39/12* (2006.01)
*F16B 39/24* (2006.01)

(52) U.S. Cl.
CPC ............... *F16B 39/12* (2013.01); *F16B 39/24* (2013.01)

(58) Field of Classification Search
CPC ....... F16B 37/042; F16B 37/122; F16B 39/02; F16B 39/12; F16B 39/24; F16B 37/04
USPC ................... 411/108, 109, 190, 191
See application file for complete search history.

(56) References Cited

U.S. PATENT DOCUMENTS

| | | | |
|---|---|---|---|
| 1,996,128 A | 4/1935 | Thomson | |
| 2,400,318 A * | 5/1946 | Rosan | F16B 37/122 123/169 R |
| 2,444,145 A * | 6/1948 | Rosan | F16B 37/122 285/202 |
| 2,573,226 A * | 10/1951 | Shafer | F16B 39/24 411/154 |
| 2,822,014 A * | 2/1958 | Cummaro | B29C 70/58 411/109 |
| 2,849,046 A * | 8/1958 | Cummaro | B29C 70/58 411/109 |
| 2,886,090 A * | 5/1959 | Rosan | F16B 35/005 411/109 |
| 3,259,161 A * | 7/1966 | Rosan | F16B 39/10 285/92 |
| 3,259,162 A * | 7/1966 | Rosan | F16B 39/10 285/92 |
| 3,395,934 A | 8/1968 | Rosan et al. | |
| 3,870,092 A * | 3/1975 | Rusk | B22C 7/06 164/249 |
| 4,534,101 A | 8/1985 | Rosán, Jr. | |

(Continued)

OTHER PUBLICATIONS

Great Britain Search Report for Great Britain Application No. 1520715.2 mailed Feb. 12, 2016.

*Primary Examiner* — Roberta Delisle
(74) *Attorney, Agent, or Firm* — Carlson, Gaskey & Olds, PC

(57) ABSTRACT

A fitting has a threaded insert to be tightened within a housing bore. A first lock ring has an anti-rotation structure on an outer peripheral surface to interfit with anti-rotation structure in a housing. The first lock ring has a face extending generally perpendicular to an axis of the insert, with anti-rotation structure included on the first face. A second lock ring has anti-rotation structure on a face which extends perpendicular to an axis of the threaded insert. The anti-rotation structure on the faces of the first and second lock ring interfit to resist relative rotation of the two. An assembly is also disclosed.

16 Claims, 3 Drawing Sheets

(56) References Cited

U.S. PATENT DOCUMENTS

| | | | | |
|---|---|---|---|---|
| 5,090,855 A | * | 2/1992 | Terry | F16B 39/24 |
| | | | | 29/525.02 |
| 5,203,656 A | * | 4/1993 | McKinlay | F16B 39/282 |
| | | | | 411/149 |
| 5,266,258 A | * | 11/1993 | Martin | B29C 65/44 |
| | | | | 264/249 |
| 2012/0308389 A1 | | 12/2012 | Harbin et al. | |

* cited by examiner

FITTING WITH DUAL SERRATED LOCKING RINGS

BACKGROUND OF THE INVENTION

This application relates to a fitting.

Various type fittings are known and are utilized to connect components together. One type fitting includes a threaded insert driven into a threaded bore in a housing. A ring may be deployed after torqueing of the fitting into the housing. The ring has serrations on an outer periphery which interfit with serrations in the housing bore.

The ring locks the insert against tightening or loosening as it can no longer rotate. However, maintenance of such fittings is complicated.

SUMMARY OF THE INVENTION

A fitting has a threaded insert to be tightened within a housing bore. A first lock ring has an anti-rotation structure on an outer peripheral surface to interfit with anti-rotation structure in the housing. The first lock ring has a first face, with anti-rotation structure. A second lock ring has anti-rotation structure on a second face. The anti-rotation structure on the faces of the first and second lock ring interfit to resist relative rotation of the two. An assembly is also disclosed.

These and other features may be best understood from the following drawings and specification.

DETAILED DESCRIPTION

Figure 1:
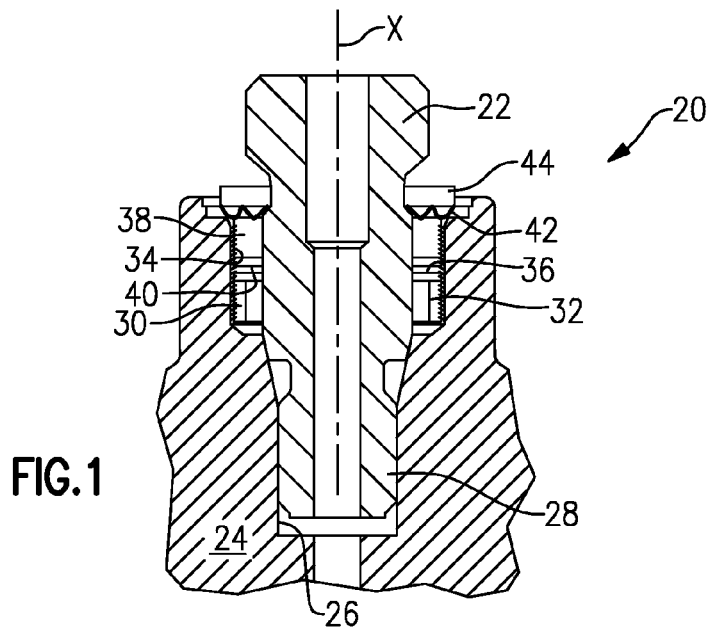
FIG. 1 shows an improved fitting.

FIG. 1 shows an improved fitting 20 including a threaded insert 22 received within a housing 24. Fitting 20 provide a fluid connection such as a hydraulic connection. Threads 26 within the housing receive threads 28 on the insert 22. The insert 22 is torqued into the housing to provide a secure connection.

Figure 2A:
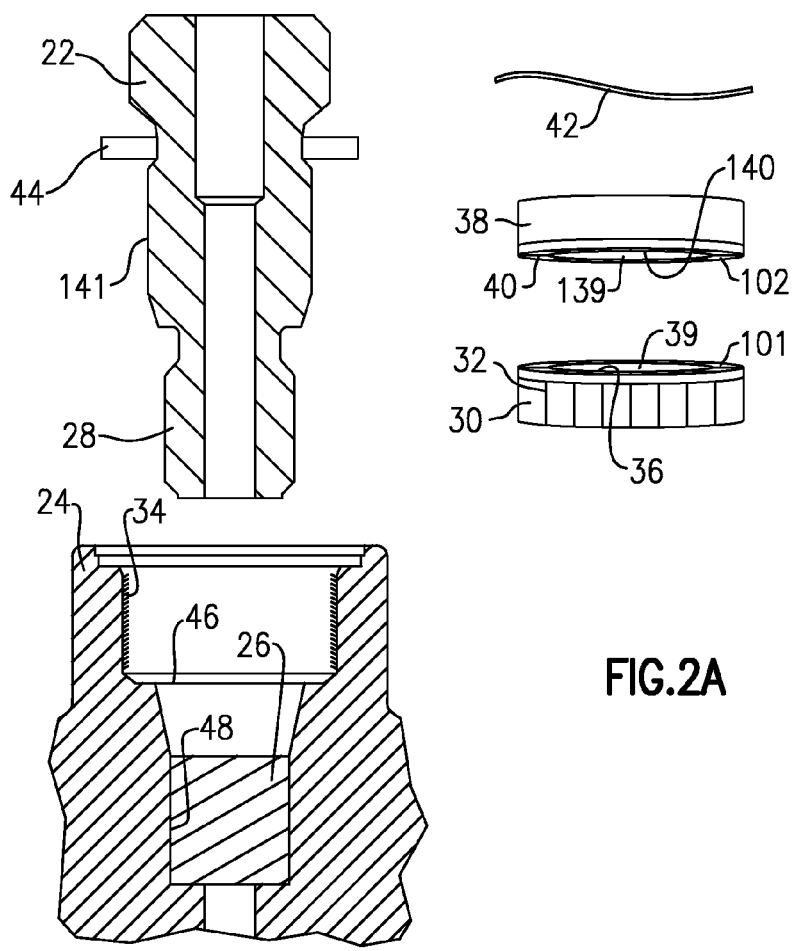
FIG. 2A shows an exploded view.

A lower or first lock ring 30 has serrations 32 on an outer peripheral surface which interfit with serrations 34 in the housing 24. The first lock ring 30 also has upper serrations 36 on a flat face 101 (as shown in FIG. 2A). A second or upper lock ring 38 has interfitting serrations 40, on face 102 (as shown in FIG. 2A), which interfit with the serrations 36 on the lock ring 30 to prevent relative rotation between the two lock rings, and therefore the fitting. These are no serrations on the outer peripheral surface of ring 38. Alternatively, rather than preventing rotation, the fitting 20 can allow rotation only in the "tighten" direction. This can be established by the ramp angles. In general, the closer the ramp angles of the serrations on the flat faces are to being parallel to the axis X, the more resistant to rotation the interfitting serrations will be. Thus, by lowering this angle, a combination can be made that will allow tightening, but not loosening.

As shown in FIG. 2A, the lock rings 30 and 38 have a bore 39/139, through which threaded insert 22 will extend. The lock ring 38 has serrations 140 on the bore 139 which interfit with serrations 141 on the threaded insert 22 to prevent rotation of the threaded insert through the lock rings 30 and 38.

A wave spring 42 is forced downwardly by a ledge 44 on the insert 22, such that when the insert 22 is torqued within the housing 24, a force from the wave spring 42 biases the second lock ring 38 against the first lock ring 30.

To assemble the fitting 20, a first step includes the housing 24 initially having a first chamber or bore 46 and a second chamber or bore 48. The components to form the fitting 20 include the threaded insert 22, the wave spring 42, and the lock rings 30 and 38, all outside of the housing 24.

Figure 2B:
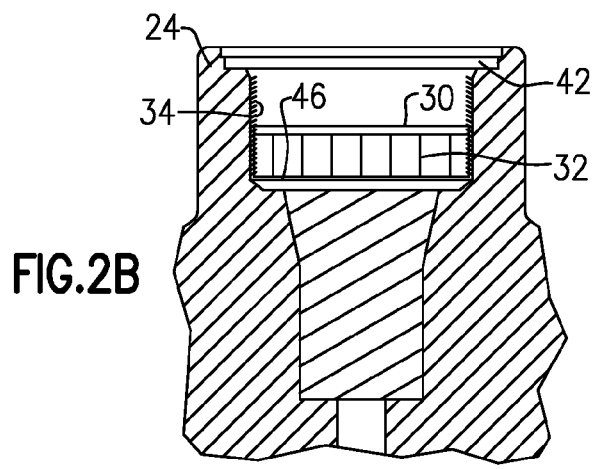
FIG. 2B shows a first step.

FIG. 2B shows a first step in which the first lock ring 30 is moved within the chamber 46. The serrations 32 and 34 interfit such that lock ring 30 may not rotate. As can be seen, serrations 34 are formed on a inner peripheral surface of the first chamber or bore 46.

Figure 2C:
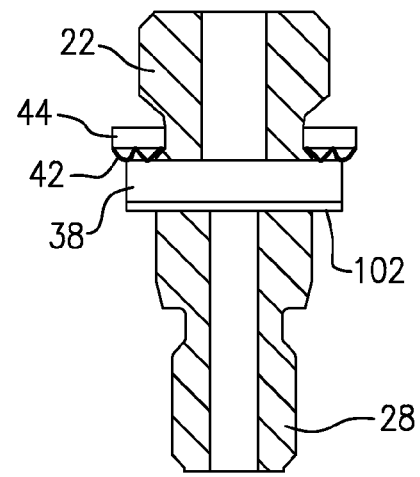
FIG. 2C shows a subsequent step.
Figure 2C:
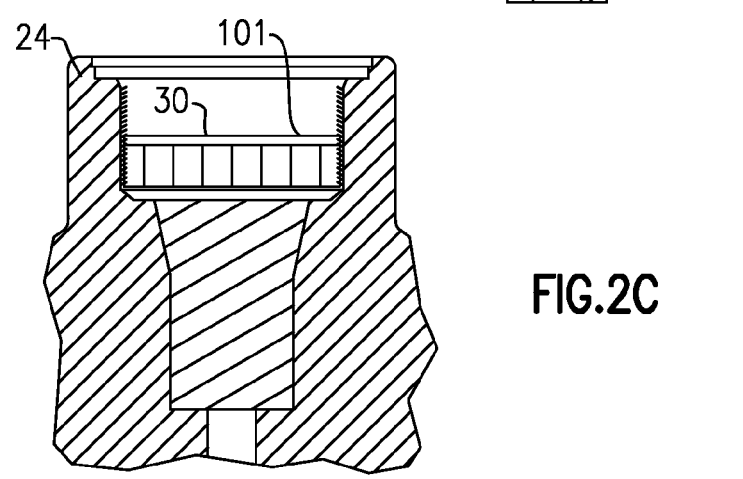

As shown in FIG. 2C, a subassembly of the insert 22, the wave spring 42, and the second lock ring 38 is then put together. The wave spring 42 is placed axially intermediate the ledge 44 and the second lock ring 38 in this subassembly.

Figure 2D:
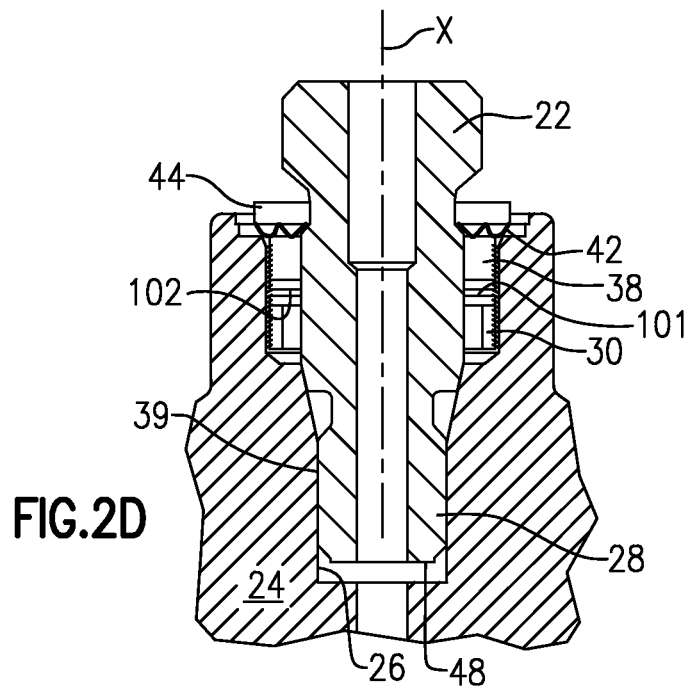
FIG. 2D shows a final step.

As shown in FIG. 2D, the insert 22 is inserted through the bore 39 in lock ring 30 and is torqued within the chamber 48. When fully torqued, the fitting 20 will resemble the assembly of FIG. 1.

The fitting is much simpler to assemble and maintain than the existing fittings. One can tighten the fitting at any time in the field, remove or replace the fitting without removing the first lock ring 30. No additional locking structure is required. A robust simple and light weight assembly that will prevent accidental loosening is, thus, provided. The assembly can be made or removed singlehandedly by a single user.

In one embodiment, housing 24 has a first bore or chamber 46 of a generally enlarged cross-section. The first bore 46 is provided with anti-rotation structure. The housing 24 has a second bore or chamber 48 with a smaller cross-section. The second bore 48 is spaced from an outer face of the housing by a greater distance than the first bore 46. The second bore 48 is provided with threads.

A threaded insert 22 has threads tightened within the second bore 48. Since the ring 38 has serrations that interfit with serrations on the insert 22, insert 22 will not rotate relative to ring 38. Ring 38 does not have serrations at its outer peripheral surface so that it can rotate relative to the housing 24, until serrations 40 and 36 engage. A first lock ring 30 has non-rotation structure 32 interfitting with non-rotation structure in housing 24 on an outer peripheral surface of the first lock ring 30. The first lock ring 30 has a face 101 extending generally perpendicular to an axis x of the threaded insert 22, with anti-rotation structure 36 included on the first face 101. Second lock ring 38 has anti-rotation structure 40 on a face 102 which extends generally perpendicular to axis x of the threaded insert 22. The anti-rotation structure on the faces of the first and second lock rings 30 and 38 interfit to resist relative rotation of the two and of insert 22.

Figure 3:
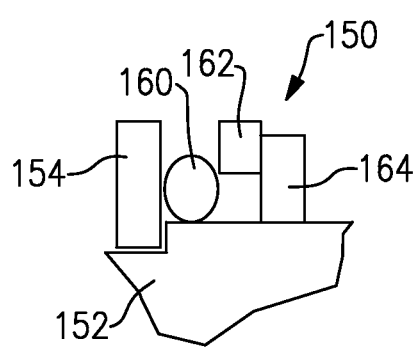
FIG. 3 shows another embodiment.

FIG. 3 shows a fitting embodiment 150 wherein the wave spring 42 is replaced by an o-ring 160 and clip 162. As shown, the threaded insert 152 has a ledge 154, and an upper lock ring 164. The o-ring 160 provides the bias force provided by the wave spring 42 in the first embodiment.

The ledge 44 may be a removable pre-loaded clip. Removal of the clip from the FIG. 1 (or FIG. 2D) position, allows the upper lock ring 38 to be removed which will then allow removal of the insert.

The mating serrations on the outer diameter of the insert and the inner diameter of upper ring 38 may also be designed with a light interference. Upon completion of tightening of the insert 22 the upper ring 38 can be deployed downward to mate with the lower ring 30. This will allow for interfit of the serrations 40 of upper lock ring 38 with the serrations 36 of lower lock ring 30.

Of course, other type of loading devices to provide a spring force can be utilized. In addition, the spring force provides dampened vibration response.

The serrations are shown somewhat schematically in the Figures. The type of serrations which may be utilized may be those similar to those found in fasteners known as "Rosan™" fittings. Of course, other types of anti-rotation structure may be utilized.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A fitting comprising:
a threaded insert having threads to be tightened within a housing bore; and
a first lock ring having non-rotation structure on an outer peripheral surface to interfit with mating non-rotation structure on an inner pheripheral surface of the housing bore, and said first lock ring having a first face, with anti-rotation structure included on said first face and a second lock ring having anti-rotation structure on a second face, with said anti-rotation structure on said first and second faces interfitting to resist relative rotation of the two.

2. The fitting as set forth in claim 1, wherein said anti-rotation structure includes serrations on said outer peripheral surface of said first lock ring and on said first and second faces of said first and second lock ring.

3. The fitting as set forth in claim 1, wherein there is anti-rotation structure on an inner bore of said second lock ring which interfits with anti-rotation structure on an outer diameter of said threaded insert to resist relative rotation of the two.

4. The fitting as set forth in claim 1, wherein said anti-rotation structure on said first and second faces prevents any relative rotation.

5. The fitting as set forth in claim 1, wherein said anti-rotation structure on said first and second faces allows relative rotation in a direction to tighten said threaded insert into a housing.

6. The fitting as set forth in claim 1, wherein a ledge is provided on said threaded insert and a spring is positioned intermediate said ledge and said second lock ring, such that when said fitting is torqued within a housing, said ledge applies a force holding said spring, and said spring provides a bias force urging said second face anti-rotation structure into said first face anti-rotation structure.

7. A fitting comprising:
a threaded insert having threads to be tightened within a housing bore;
a first lock ring having non-rotation structure on an outer peripheral surface to interfit with mating non-rotation structure in the housing, and said first lock ring having a first face, with anti-rotation structure included on said first face and a second lock ring having anti-rotation structure on a second face, with said anti-rotation structure on said first and second faces interfitting to resist relative rotation of the two; and
wherein a ledge is provided on said threaded insert and a spring is positioned intermediate said ledge and said second lock ring, such that when said fitting is torqued within a housing, said ledge applies a force holding said spring, and said spring provides a bias force urging said second face anti-rotation structure into said first face anti-rotation structure.

8. The fitting as set forth in claim 7, wherein said anti-rotation structure includes serrations on said outer peripheral surface of said first lock ring and on said first and second faces of said first and second rock ring.

9. The fitting as set forth in claim 7, wherein said spring is a wave spring.

10. The fitting as set forth in claim 7, wherein said spring includes an o-ring.

11. A fitting assembly comprising:
a housing having a first bore of a generally enlarged cross-section and said first bore being provided with anti-rotation structure, and said housing having a second bore with a smaller cross-section, and said second bore being spaced from an outer face of said housing structure by a greater distance than said first bore, with said second bore being provided with threads;
a threaded insert having threads tightened within said second bore; and
a first lock ring having non-rotation structure on an outer peripheral surface interfitting with anti-rotation structure in a housing of said first lock ring, and said first lock ring having a first face, with anti-rotation structure included on said first face and a second lock ring having anti-rotation structure on a second face, with said anti-rotation structure on said first and second faces interfitting to resist relative rotation of the two, there being anti-rotation structure on an inner bore of said second lock ring which interfits with anti-rotation structure on an outer diameter of said threaded insert to resist relative rotation of the two.

12. The fitting assembly as set forth in claim 11, wherein said anti-rotation structure includes serrations on said outer peripheral surface of said first lock ring, in said first bore and on said first and second faces of said first and second rock rings.

13. The fitting assembly as set forth in claim 11, wherein a ledge is provided on said threaded insert and a spring is positioned intermediate said ledge and said second lock ring, said ledge holding said spring, such that said spring provides a bias force urging said second face anti-rotation structure into said first face anti-rotation structure.

14. The fitting assembly as set forth in claim 13, wherein said anti-rotation structure includes serrations on said outer peripheral surface of said first lock ring, in said first bore and on said first and second faces of said first and second rock rings.

15. The fitting assembly as set forth in claim 13, wherein said spring is a wave spring.

16. The fitting assembly as set forth in claim 13, wherein said spring includes an o-ring.

* * * * *

UNITED STATES PATENT AND TRADEMARK OFFICE
CERTIFICATE OF CORRECTION

| | | |
|---|---|---|
| PATENT NO. | : 9,541,119 B2 | Page 1 of 1 |
| APPLICATION NO. | : 14/563274 | |
| DATED | : January 10, 2017 | |
| INVENTOR(S) | : Leo J. Veilleux | |

It is certified that error appears in the above-identified patent and that said Letters Patent is hereby corrected as shown below:

In the Claims

In Claim 2, Column 3, Line 36; "ring" should read as --rings--

In Claim 8, Column 4, Line 15; delete "rock ring" and replace with --lock rings--

In Claim 12, Column 4, Line 45; delete "rock" and replace with --lock--

In Claim 14, Column 4, Line 56; delete "rock" and replace with --lock--

Signed and Sealed this
Eleventh Day of April, 2017

Michelle K. Lee
*Director of the United States Patent and Trademark Office*